United States Patent
Huomo

(10) Patent No.: US 7,392,036 B2
(45) Date of Patent: Jun. 24, 2008

(54) MONITORING AND REPORTING SERVICE FAILURES DURING HANDOFF SITUATIONS FOR ADJUSTING SUBSCRIBER BILLING

(75) Inventor: Miikka Huomo, Vantaa (FI)

(73) Assignee: Nokia Corporation, Espoo (FI)

( * ) Notice: Subject to any disclaimer, the term of this patent is extended or adjusted under 35 U.S.C. 154(b) by 714 days.

(21) Appl. No.: 10/377,119

(22) Filed: Mar. 3, 2003

(65) Prior Publication Data

US 2003/0194997 A1    Oct. 16, 2003

(30) Foreign Application Priority Data

Mar. 1, 2002    (GB) ................... 0204896.5

(51) Int. Cl.
*H04M 15/00* (2006.01)
*H04Q 7/20* (2006.01)

(52) U.S. Cl. .............. 455/406; 379/114.01; 379/115.01; 455/432.1; 455/436

(58) Field of Classification Search ......... 455/405–408, 455/432.1, 436; 379/114, 115, 114.01, 115.01
See application file for complete search history.

(56) References Cited

U.S. PATENT DOCUMENTS

| | | | | |
|---|---|---|---|---|
| 5,095,500 A | * | 3/1992 | Tayloe et al. ............. | 379/32.01 |
| 6,311,054 B1 | * | 10/2001 | Korpela ....................... | 455/406 |
| 6,567,657 B1 | * | 5/2003 | Holly et al. ................. | 455/408 |
| 6,785,541 B2 | * | 8/2004 | Martin ........................ | 455/423 |
| 6,836,653 B1 | * | 12/2004 | Kang .......................... | 455/408 |
| 7,171,189 B2 | * | 1/2007 | Bianconi et al. ............ | 455/408 |
| 2002/0082991 A1 | * | 6/2002 | Friedman et al. ............. | 705/40 |
| 2003/0120499 A1 | * | 6/2003 | MacLean et al. ............. | 705/1 |

FOREIGN PATENT DOCUMENTS

| | | |
|---|---|---|
| WO | WO 01/37601 A1 | 5/2001 |
| WO | WO 01/67706 A2 | 9/2001 |
| WO | WO 02/11468 A2 | 2/2002 |

\* cited by examiner

*Primary Examiner*—Harry S. Hong
(74) *Attorney, Agent, or Firm*—Squire, Sanders & Dempsey L.L.P.

(57) ABSTRACT

A method in a communication system comprising at least one access network controller entity for controlling a plurality of service areas and a core network controller entity. The access network controller entity reports to the core network controller entity movement of a user equipment from a first service area to a second service area. The report contains indication that the user equipment has moved to be served within the second service area. The report contains also information regarding the volume of data that was not communicated between the user equipment and communication means of the first service area while the user equipment was served within the first service area.

27 Claims, 4 Drawing Sheets

MONITORING AND REPORTING SERVICE FAILURES DURING HANDOFF SITUATIONS FOR ADJUSTING SUBSCRIBER BILLING

FIELD OF THE INVENTION

The present invention relates to data transmissions in a communication system, and more particularly, to data transmission between an access network and a user equipment.

BACKGROUND OF THE INVENTION

Communication systems that enable transmission of data to and from a user equipment, such as a mobile user terminal referred to as a mobile station are known. Data may be transmitted between the user equipment and another node, for example a server or another user terminal. A communication system typically operates in accordance with a given standard or specification which sets out what the various elements of the system are permitted to do and how that should be achieved. For example, it may be defined if the user, or more precisely, a user equipment or terminal is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable communication by means of the communication system.

Communication systems that provide mobility for the users thereof are known. The skilled person is aware of the basic principles of such mobile communication systems. A well known example is the public land mobile network (PLMN), known also as a cellular communication network. Another example is a mobile communication system that is at least partially based on use of communication satellites. Examples of mobile communication standards and/or specifications include, without limiting to these, specifications such as GSM (Global System for Mobile communications), GPRS (General Packet Radio Service), EDGE (Enhanced Data rate for GSM Evolution), AMPS (American Mobile Phone System), DAMPS (Digital AMPS), or $3^{rd}$ generation (3G) communication systems such as the Universal Mobile Telecommunication System (UMTS), i-phone and so on.

User equipment (UE) may be served by various service areas (SA) of a communication system. In a typical case the service area can be defined as a certain area covered by at least one base transceiver station (BTS) that serves user equipment (UE) within the service area. The user equipment (UE) within one of the service areas may be controlled by one or several control entities. Examples of the control entities include radio network controllers such as a base station controller (BSC) of the GSM system and a radio network controller (RNC) of the $3^{rd}$ generation (3G) systems. An access network controller is in communication with appropriate core network (CN) control entities. The core network entities may comprise control nodes such as a mobile switching center (MSC), a serving GPRS support node (SGSN) and various gateway nodes such as a gateway GPRS support node (GGSN) or gateway mobile switching center (GMSC). The network entities may also include nodes for storing information that associates with user equipment subscribing the network or visiting the network, such as appropriate home location registers (HLR) and visitor location registers (VLR). Depending on the implementation, a register node may be integrated with another network entity, or it may be a standalone network node.

A mobile communication system provides mobility for the user equipment in communication over a wireless interface with the network system. The user equipment is enabled to change from a service area to another service area. The change may occur e.g. when a user equipment moves i.e. roams from a cell to another cell. The user equipment may change even from a network system to another network system, as long as the user equipment is compatible with the standard of said other system.

Reception and/or transmission of data may be charged from the user equipment or other party involved in the data communication. Various possible schemes to implement the charging are known. For example, the subscription of the user equipment may be charged based on the capacity that was required for the transmission of data. The capacity may be measured as a volume of the data transmitted and/or received and/or based on time that was used for the data transmission. In some application the charge may also depend on the service the user equipment is using, and so on.

The charge may also depend on the location of the subscriber. For example, the operator of the communication system may have defined Service Areas (SAs) such that the subscriber is charged differently from similar services when located within different service areas. The charge may also depend on both the service the subscriber uses and his/hers location.

It is important that the charging is done correctly and fairly. An important part of the charging function is that the subscriber is not charged from any unsuccessful data transmissions. This unsuccessfully transmitted data will be referred to in the following as unsent data or 'Unsuccessfully Transmitted Data Volume'. The 'Unsuccessfully Transmitted Data Volume' indicates the data volume (typically in octets) that is unsuccessfully transmitted over the radio interface via a radio access bearer (PAB). The data transmission may occur either in downlink (DL) or uplink (UL) direction.

If the subscriber moves from a service area to another service area where a different charge is levied for data transmission, the charging function should be able to charge the subscriber such that the charge includes only cost for the successful data transmissions rather than unsuccessful. That is, if the data cannot be sent while the user equipment is within the first service area but only when the user equipment is within a second service area, the bill should take this into account. However, the inventor has found that this is not possible in the prior art charging solutions.

FIG. 2a is a signalling flowchart in accordance with a prior art operation, and more particularly, illustrates the signalling flow in the context of the current 3G GPRS and/or UMTS systems. The prior art operation is such that when a subscriber changes from a service area to another, the radio network controller (RNC) generates a location report and sends it to a serving GPRS support node (SGSN).

The SGSN may ask for information regarding the Unsuccessfully Transmitted Data Volume from the radio network controller (RNC). This can be done by means of a Data Volume Request. However, the requests and responses may load substantially the interface and the network elements involved. Thus, if the SGSN wishes to receive information about possible unsent data from the RNC, it has to send a separate request for this information back to the RNC. If the subscriber moves rapidly, and thus several service area changes occurs within a short period of time, the SGSN and RNC become substantially heavily loaded. These location reports may occur at one SGSN at a rate of 10 million per a busy hour depending on the manner the network has been planned and the amount of subscriber movements. If the SGSN has to ask for information about unsent data from the RNC every time a location report arrives, the traffic load between the RNC and SGSN may also become substantially high. Therefore, if information about the unsent data is to be collected an easier way of doing so would be advantageous.

The prior art arrangements may not be able to provide exact information about the lost data in specific radio access areas such as in specific cells. A reason for this is that the RNC reports lost data only after being asked to do so.

SUMMARY OF THE INVENTION

Embodiments of the present invention aim to address one or several of the above problems.

According to one aspect of the present invention, there is provided a method in a communication system comprising at least one access network controller entity for controlling a plurality of service areas and a core network controller entity, wherein the access network controller entity reports to the core network controller entity movement of a user equipment from a first service area to a second service area, said report containing indication that the user equipment has moved to be served within the second service area and also information regarding the volume of data that was not communicated between the user equipment and communication means of the first service area while the user equipment was served within the first service area.

According to another aspect of the present invention there is provided a communication system provision of data communication services for a user equipment, the communication system comprising: an access network controller entity for controlling a plurality of service areas; and a core network controller entity, wherein the access network controller entity reports to the core network controller entity movement of the user equipment from a first service area to a second service area, said report containing indication that the user equipment has moved to be served within the second service area and also information regarding the volume of data that was not communicated to the user equipment while the user equipment was served within the first service area.

In a more specific form of the invention, said information in the report regarding the volume of data that was not communicated between the user equipment and the communication means is forwarded from the core network entity to a charging function of the communication system.

A different charging scheme may be used for data transmission to and/or from the user equipment within the first service area to that of the second service area. The charging of data transmission may be adjusted based on said report.

Said information about the volume of unsent data may be used in optimisation of data communication resources and/or in monitoring of used data communication resources.

The access network controller entity may determine the volume of said unsent data and generate the report including said indication of change in the service area and information regarding the volume of data that was not communicated between the user equipment and communication means. The report may contain information regarding one service area only.

The report may comprise a location report.

The access network controller entity may comprise a radio network controller (RNC). The core network controller entity may comprise a serving General Packet Radio Service support node (SGSN).

A request per a packet data protocol context from the core network controller entity may result to a report containing indication that the user equipment has changed the service area and information regarding the volume of data that was not communicated to the user equipment while the user equipment was served within the old service area each time the service area is changed during the packet data protocol context.

The embodiments of the invention may provide an arrangement wherein information about changes in the service area and charging information can be handled simultaneously. The interface between the two network elements, such as the access network controller (e.g. an RNC) and a core network controller entity (e.g. a SGSN) may be less loaded. It may also be possible to reduce the load caused on the controller entities. More accurate and real-time information regarding the unsuccessfully transmitted data volume may be provided. A more specific embodiment is advantageous in that a more correct and fair charging of data transmissions may be provided. The invention may also be advantageous in other application than charging. For example, the automatically provided unsent data volume reports may be utilised by transmission quality control and optimisation applications.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
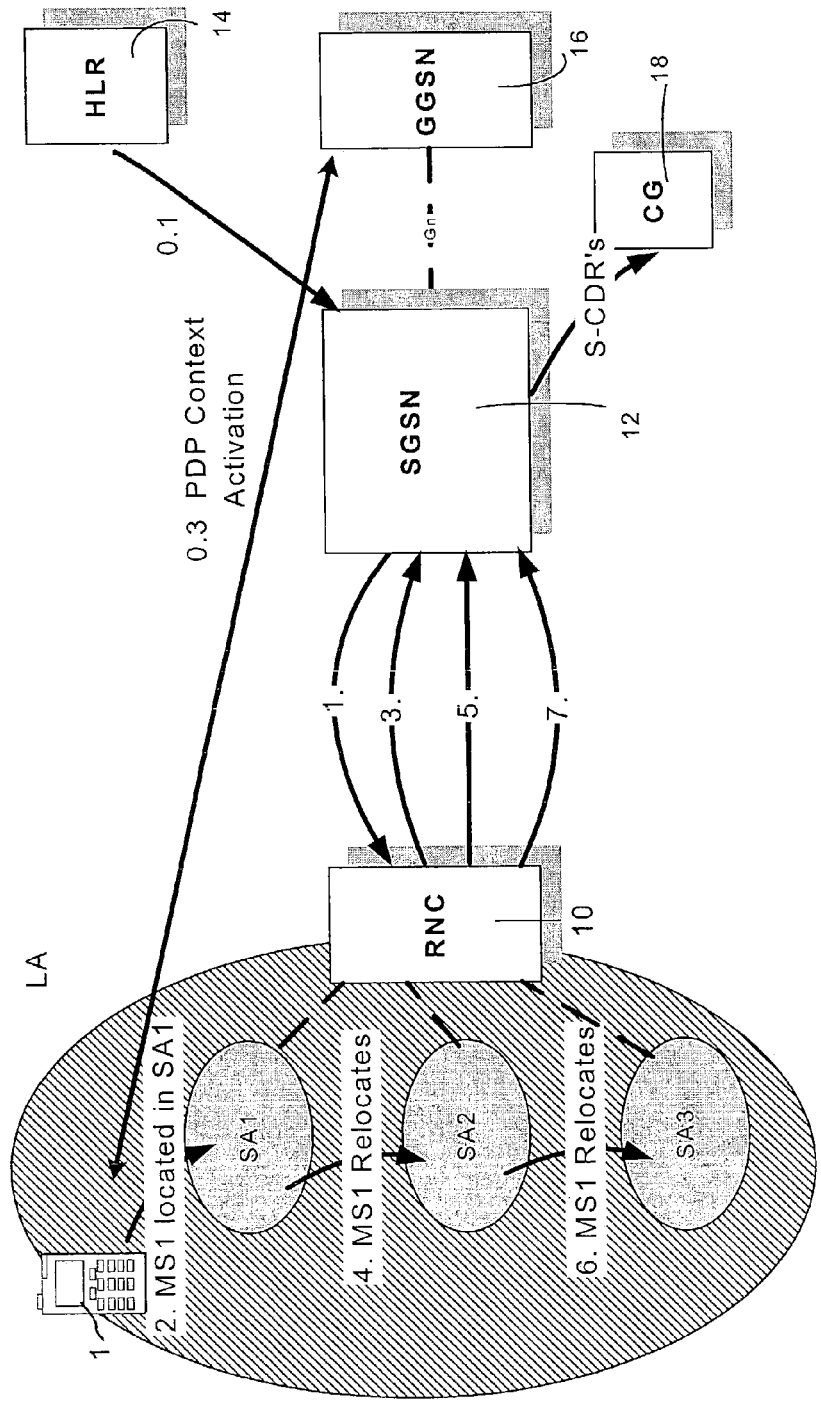
FIG. 1 shows one embodiment of the present invention.

Reference is made to FIG. 1 which shows a communication system architecture wherein embodiments of the present invention may be implemented. A mobile user equipment 11 is capable of communication via the communication system 13 via radio coverage i.e. access areas referred to as service areas (SA1, SA2, SA3).

Each service area is typically served by a base station (not shown for clarity). A service area (SA1, SA2, SA3) may be provided by means of one or more base stations. A base station apparatus or site may also provide more than one service area. The shape and size of the service areas depends on the implementation and will in practice be different from the illustrated oval shape. The shape and size of the service areas may also vary from service area to service area.

The service area is provided by means of a radio access network (RAN). Each of the service areas is controlled by an access network controller. In FIG. 1 a third generation (3G) radio network controller (RNC) 10 is provided for this purpose.

The access network controller 10 may be connected to appropriate core network (CN) entities of the cellular system via suitable interfaces. FIG. 1 shows the following core network entities: a serving GPRS (General Packet Radio Service) support node (SGSN); a gateway GPRS support node (GGSN) 16; a home location register (HLR) 14; and charging Gateway (CG) 18. Other elements may also be provided, such as a MSC (mobile switching centre), but these are not shown for clarity.

The charging gateway 18 provides a network entity which receives charging records (CDR) from other network elements (e.g. from the SGSN and GGSN). The charging gateway gathers the CDRs of one communication session together and then forwards the collected CDR to a billing system.

In FIG. 1 the user equipment comprises a mobile station (MS) 11. It shall be appreciated that a number of user equipments may be in communication via the communication system although only one mobile user equipment is shown in FIG. 1 for clarity. Each mobile user equipment is arranged to transmit signals to and receive signals from the base stations via wireless interfaces. As shown by FIG. 1, the location of the mobile user equipment 11 may vary in time as the user equipment is free to move within a service area and from a service area to another service area.

The following describes in more detail an embodiment wherein a subscriber can be provided with fair Service Area (SA) based charging based on information of any unsent data. Such an occasion may occur in the downlink e.g. if the SGSN 12 keeps sending data to the mobile station 11 when the mobile station 11 cannot be reached by the RNC 10. In such occasion the RNC 10 may have no other alternative than to drop the data packets.

Information regarding the unsuccessfully transmitted data volume may be provided feasibly from the Radio Network Controller (RNC) 10 directly to the serving GPRS (General Packet Radio Service) support node 12. Information about the unsent data may be transported from the RNC 10 to the SGSN 12 via an Iu interface between said access network and core network entities. The SGSN may prepare the RNC for Data Volume Counting e.g. during the so called PDP (Packet Data Protocol) Context Activation procedure, see step 30 in FIG. 3. This procedure is indicated in FIG. 1 by the two headed arrow 0.3.

In step 2 of FIG. 1 a subscriber, and more particularly, the user equipment 11 of the subscriber is shown as being initially located in a first service area SA1. The subscriber then relocates at step 4 to service area SA2. A further relocation occurs at step 6 to service area SA3.

Instructions that trigger the unsent data reporting may be provided from the HLR 14 to the SGSN 12. For example, the HLR may contain data associated with some area specific charging services that request the 'Location Reporting' procedure to be used. If fair charging is also used at the same time these two procedures may require that the 'unsent data' reporting is also used. In FIG. 1 this is indicated by the message 0.1 wherein, during the so called GPRS Attach procedure, the subscriber data and possible cheaper SA's are retrieved from the HLR 14.

The information from the HLR 14 may contain elements that instruct the SGSN 12 to initiate location reporting procedure as described below. The SGSN analyses the information from the HRL and realizes that location reporting procedure must be requested from the RNC, see step 32 of FIG. 3. The SGSN 12 may, after having analysed the data from the HLR, then request the RNC 10 to apply location reporting procedure for the user equipment 11, see message 1 of FIG. 1. The message 1 initiates the Location Reporting Procedure by requesting for the service area (SA) of the MS1 and information regarding unsent data. The service area identifier which is received from the PDP Context activation procedure may be written to a S-CDR.

According to a possibility a 3G-SGSN may indicate similarly at a radio access bearer (RAB) setup message whether data volume collection and reporting for the particular RAB is required or not.

It shall be appreciated that the HLR initiated procedure is only an example. The reporting feature may alternatively be a default function of the SGSN. The functionality may be activated e.g. by the operator. The reporting procedure may also be initiated by some other feature/service, for example in response to signals from a Location Service (LCS).

According to a possibility the activation may be accomplished based on subscriber data that is provided from the HLR 14 to the SGSN 12 during the so called packet data protocol (PDP) context 'attach' procedure. That is, the HLR or other database may contain subscriber specific information regarding the unsent data procedure.

A Charging Detail Record (CDR) may be generated at the charging gateway (CG) 18 during the PDP context activation procedure. Each of the service areas generates a new charging record, these being referred to as a Service GPRS-CDR.

When a subscriber changes from a service area to another (step 34 of FIG. 3), the Radio Network Controller (RNC) 10 may generate a location report. The location report is for provision of the Serving GPRS (General Packet Radio Service) Support Node 12 with an indication of the new service area. A more detailed description of a location report generation procedure and RANAP can be found e.g. from 3GPP Technical Specification 25.413 version 3.8.0 (R99). The RANAP (Radio Access Network Application Part) refers to a signalling protocol that consists of mechanisms that handle all the procedures between the core network and radio access network.

In accordance with the principles of the present invention the arrangement is such that the RNC 10 is also capable of counting the volume of any data that was not sent in a service area before the user equipment was relocated to another service. The RNC 10 may then include the counted volume of unsent data into the location report, such as any of location reports 3, 5 or 7 of FIG. 1. See also step 36 of FIG. 3. Thus each of the location reports 3, 5 and 7 includes information about the service area and unsent data.

Upon receipt of any of the location report messages 3, 5 or 7 the SGSN may then write the sent data volume minus any unsent data to the S-CDR created earlier for the previous service area and send it to the CG 18. A new S-CDR may also be created for the new service area.

The RNC may also include the so called 'Data Volume Reference' in the location report, this being indicative of the time when the data volume was counted.

Thus, in accordance with the principles of the present invention the location report also includes information of any unsent data. The volumes of data that has not been sent in the downlink direction to the user equipment can be indicated e.g. as octets (bytes) in the report.

Figure 3:
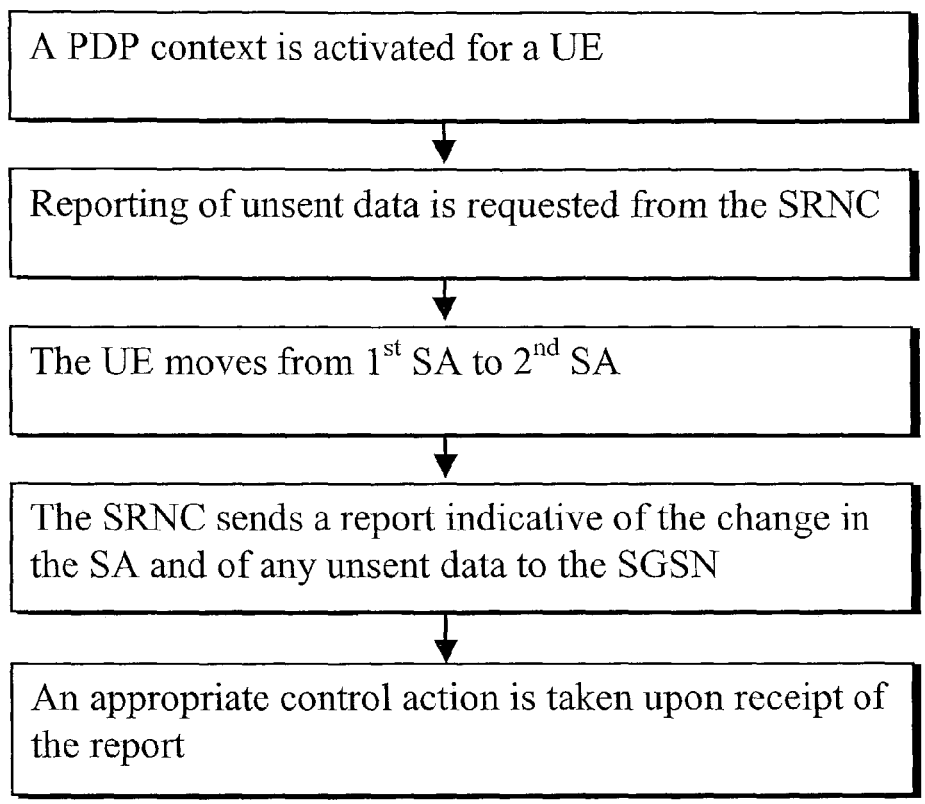
FIG. 3 is a flowchart illustrating the operation of one embodiment of the present invention.

The operation is illustrated by the flow chart of FIG. 3. The appropriate control action taken in step 38 may associate e.g. with the above referenced fair charging schemes wherein information about the volume of the actual unsent data may be utilised by a charging function 18 of the system. As shown in FIG. 1, after the relocation the SGSN 12 informs the charging function 18 in a S-CDR of any unsent data so that this can be taken into account when charging the subscriber.

As is also shown in FIG. 1, the procedure may be repeated each time the user equipment moves into a new service area, see steps 3, 5, and 7. The reporting procedure needs to be requested only once, see step 1.

If the new services area is controlled by another RNC, the SGSN may need to send a new request for the reporting from the new RNC. The existing procedure may be implicitly cancelled whenever a serving radio network controller (SRNC) is relocated. Thus, if the reporting service is still required in the new SRNC or a new SGSN, a new Location Reporting Control message may be sent.

Figure 2A:
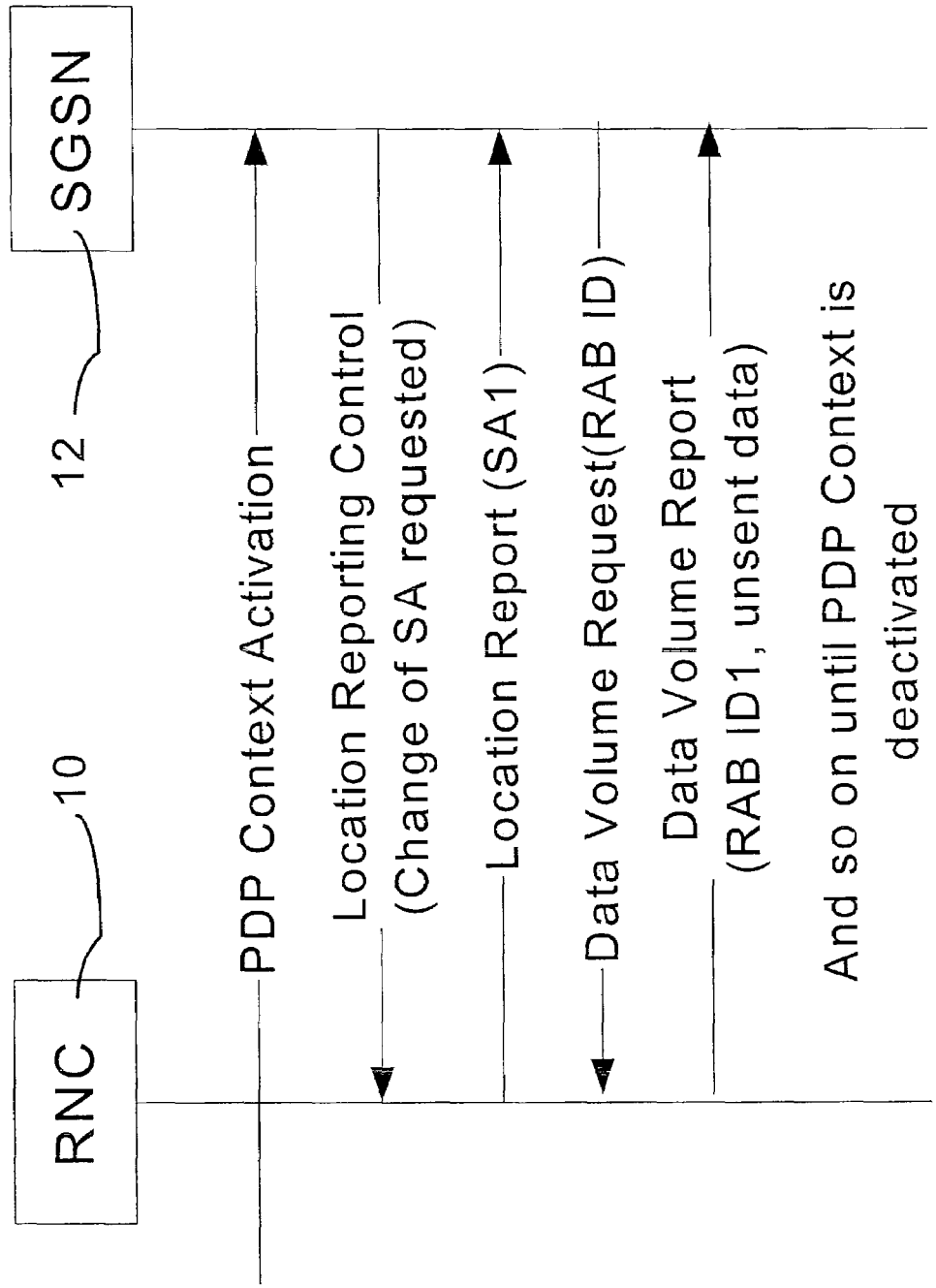
FIGS. 2a and 2b show signalling flowcharts for the signalling in accordance with the prior art and an embodiment of the present invention.

FIG. 2a illustrates the operation of the prior art reporting. As shown, after the PDP Context has been activated, the SGSN may send a location reporting control message requesting for a change in the service area. A location report indicative of the current service area is then sent from the RNC to the SGSN. It is only after these steps when initiation of the data volume reporting procedure can be done in the prior art.

Figure 2B:
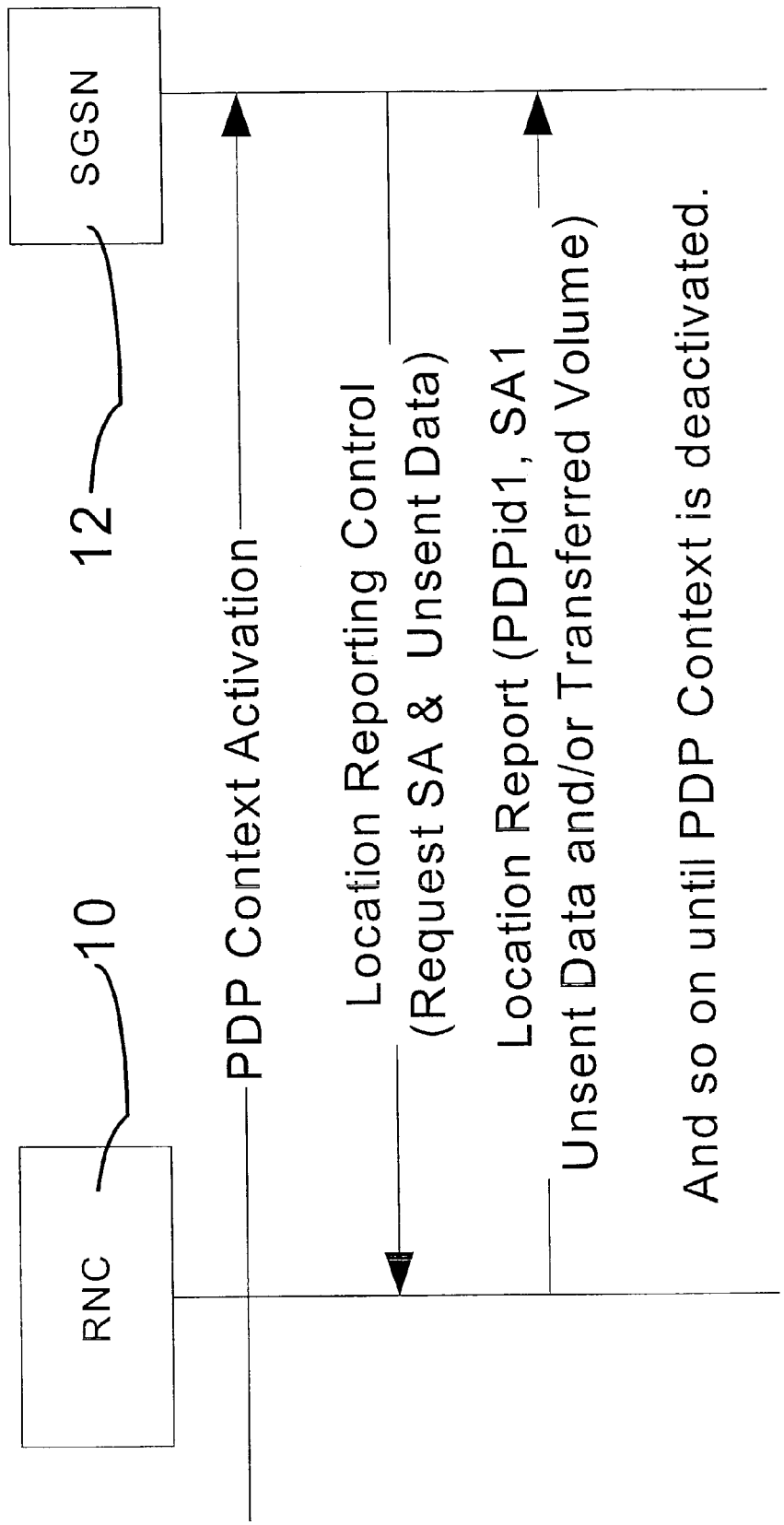

FIG. 2b illustrates the herein proposed reporting operation. As can be seen, the location reporting control message contains also an element for requesting information regarding any unsent data. Thus the unsent data volume reporting procedure can be initiated immediately. Less reporting and request steps is required and thus the reporting functions of the Serving GPRS Support Node (SGSN) and the RNC can be made simpler and faster when the volume of the unsent data is indicated in the RANAP Location Report.

The arrangement may be such that the Radio Network Controller (RNC) always fills in a unsent data parameter. If all data was sent, then the volume of the unsent data would be marked as being nil (0). By means of this it can be ensured that the SGSN 12 will always be provided with information regarding the unsent data after a change of the service area.

If the unsent data reporting is requested in the location reporting control message (message 1 in FIG. 1), the backwards compatibility issue is made easier to implement. In this case the SGSN may then know whether it will receive also the unsent data parameter in a location report. The RNC will also know whether it needs to prepare and send the parameter for the particular PDP context.

The above described embodiments may provide a charging functionality that is lighter and easier/simpler to handle by the network elements that the prior art solutions. A reason for this is that the requirement for memory space in the RNC can be reduced. This is so because less information about the unsent data needs to be stored in the RNC. The SGSN does not need to request unsent data each time in response to a location report. Instead, the SGSN will receive the information directly from each location report.

The function is advantageous e.g. when the operator offers subscribers a service wherein any unsent data can be decreased from the bills. If there is no need to report the volume of unsent data in a radio access network (RAN) to the Serving GPRS Support Node (SGSN), the procedure may be simply avoided by not requesting the report during the location reporting requesting procedure. The operator may also provide this service for those subscribers who wish to have it. The service is then activated in response to indication received from the HLR together with other subscriber data during PDP context activation.

It is noted that although the above discusses a solution wherein data is transmitted in the downlink (DL), i.e. in the direction from a base station to a mobile station, the invention may also be used for the uplink (UL) data transmissions. A similar situation may occur in the UL e.g. if the mobile station sends data (i.e. the PDP Context is active) but the SGSN does not receive the packets (e.g. due to a error in lower protocol layer). Again, the RNC may be forced to drop the packets, thus resulting to unsent data. The unsent data in the uplink may be counted by the RNC in a similar way as in the downlink, e.g. as specified in the above referenced 3GPP Technical Specification 25.413.

Other elements than the radio network controller may also be used for the counting. For example, the lost data may be counted by the Base Station. The received data may also be counted at the user equipment, if the user equipment can be trusted. The send data may also be counted e.g. by the SGSN, GGSN, an Application Server or an intermediate proxy.

In addition to charging the invention may be utilized for other purposes as well. For example, e.g. network structure optimisation functions may monitor the used and lost capacity based on the SGSN counters and received unsent data reports. If lots of 'unsent-data' is detected in some specific cells, the operator may wish to optimise the transmissions in these cells. Information regarding the unsent data (e.g. if there were many lost bytes) may also be used as an indication to the user equipment that the connection was bad and therefore the user equipment may not have received the data in an appropriate manner. The SGSN may also send a message to the user equipment that the radio coverage was bad and the problem is about to be corrected. The user equipment may be prompted to change the cell.

Network resource optimisation may also utilize this e.g. when determining when and/or where there is free capacity to be used. The unsent data volume information may be stored as statistical information and then processed later by an appropriate network optimising entity. Information regarding the unsent data volumes may also be sent directly to a network monitor.

It should be appreciated that whilst embodiments of the present invention have been described in relation to mobile stations, embodiments of the present invention are applicable to any other suitable type of user equipment that may be relocated from one service are to another. It should also be appreciated that whilst embodiments of the present invention have been described in relation to GPRS entities, embodiments of the present invention are applicable to any other suitable type of communication systems wherein a similar problem may occur.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   controlling a plurality of service areas in a communication system with an access network controller entity, wherein the communication system also comprises a core network controller entity;
   reporting, by the access network controller entity to the core network controller entity, movement of a user equipment from a first service area to a second service area in a report;
   including in said report an indication that the user equipment has moved to be served within the second service area and also information regarding the volume of data that was not communicated between the user equipment and a communication unit of the first service area while the user equipment was served within the first service area.

2. The method of claim 1, further comprising:
   forwarding said information in the report regarding the volume of data that was not communicated between the user equipment and the communication unit from the core network entity to a charging function of the communication system.

3. The method of claim 1, further comprising:
   using a different charging scheme for data transmission to and/or from the user equipment within the first service area compared with that of the second service area; and adjusting the charging of the data transmissions based on said report.

4. The method of claim 1, further comprising:
optimizing data communication resources based on said information about the volume of unsent data.

5. The method of claim 1, further comprising
monitoring used data communication resources using said information about the volume of unsent data.

6. The method of claim 1, further comprising:
determining, by the access network controller entity, the volume of said unsent data; and
generating, by the access network controller entity, the report including said indication of change in the service area and information regarding the volume of data that was not communicated between the user equipment and the communication unit of the first service area.

7. The method of claim 6, wherein the generating the report comprises generating the report such that the report contains information regarding one service area only.

8. The method of claim 1, wherein the generating the report comprises generating a location report.

9. The method of claim 1, further comprising:
configuring the access network controller entity to comprises a radio network controller.

10. The method of claim 1, further comprising:
configuring the core network controller entity to comprise a serving general packet radio service support node.

11. The method of claim 1, further comprising:
providing, responsive to a request per a packet data protocol context from the core network controller entity results, the report each time the service area is changed during the packet data protocol context.

12. A communication system, comprising:
an access network controller entity configured to control a plurality of service areas; and
a core network controller entity,
wherein the access network controller entity is configured to report to the core network controller entity movement of a user equipment from a first service area to a second service area in a report,
wherein said report comprises an indication that the user equipment has moved to be served within the second service area and also comprises information regarding the volume of data that was not communicated to the user equipment while the user equipment was served within the first service area, and
wherein the communication system is configured to provide data communication services for the user equipment.

13. The communication system of claim 12, wherein said access network controller entity is further configured to provide said information regarding the volume of unsent data to a charging function of the communication system.

14. A communication system, comprising:
access network control means for controlling a plurality of service areas; and
core network means for receiving, from the access network control means, a report comprising first information regarding movement of a user equipment from a first service area to a second service area, the report including an indication that the user equipment has moved to be served within the second service area, and second information regarding the volume of data that was not communicated to the user equipment while the user equipment was served within the first service area; and
provision means for providing data communication services for the user equipment.

15. The communication system of claim 12, wherein the report contains information regarding one service area only.

16. The communication system of claim 12, wherein the report comprises a location report.

17. The communication system of claim 12, wherein the access network controller entity comprises a radio network controller.

18. The communication system of claim 12, wherein the core network controller entity comprises a serving general packet radio service support node.

19. The communication system of claim 12, wherein the communication system is configured to provide, responsive to a request per a packet data protocol context from the core network controller entity results, the report each time the service area is changed during the packet data protocol context.

20. The communication system of claim 12, wherein the access network controller entity is configured to determine the volume of said unsent data and to generate the report including said indication of change in the service area and information regarding the volume of data that was not communicated to the user equipment.

21. An apparatus, comprising:
a controller configured to control a plurality of service areas and to transmit, to a network receiver, a report comprising first information regarding movement of a user equipment from a first service area to a second service area,
wherein the report includes an indication that the user equipment has moved to be served within the second service area and second information regarding a volume of data that was not communicated to the user equipment while the user equipment was served within the first service area.

22. The apparatus of claim 21, comprising:
a determiner configured to determine the volume of said unsent data; and a generator configured to generate the report including said indication of change in the service area and information regarding the volume of data that was not communicated between the user equipment and the communication unit of the first service area.

23. The apparatus of claim 21, wherein the generator is configured to generate the report such that the report contains information regarding one service area only.

24. The apparatus of claim 21, wherein the generator is configured to generate a location report.

25. The apparatus of claim 21, comprising a radio network controller.

26. The apparatus of claim 21, comprising a serving general packet radio service support node.

27. An apparatus, comprising:
control means for controlling a plurality of service areas and transmitting, to a network receiver, a report comprising first information regarding movement of a user equipment from a first service area to a second service area,
wherein the report includes an indication that the user equipment has moved to be served within the second service area and second information regarding a volume of data that was not communicated to the user equipment while the user equipment was served within the first service area.

* * * * *